US008615587B2

(12) United States Patent
Mehrotra et al.

(10) Patent No.: US 8,615,587 B2
(45) Date of Patent: *Dec. 24, 2013

(54) POWER MANAGEMENT IN LINK AGGREGATION FOR DATA TRANSMISSION

(75) Inventors: Gaurav Mehrotra, Pune (IN); Laurent S. Mignet, New Delhi (IN); Abhinay R. Nagpal, Pune (IN); Sandeep R. Patil, Elsmford, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/004,611

(22) Filed: Jan. 11, 2011

(65) Prior Publication Data

US 2012/0179922 A1 Jul. 12, 2012

(51) Int. Cl.
*G06F 15/173* (2006.01)
(52) U.S. Cl.
USPC ........... 709/226; 707/600; 707/602; 707/634; 707/726
(58) Field of Classification Search
USPC ........... 709/215, 221, 203; 713/300; 370/432, 370/249, 350; 707/600
See application file for complete search history.

(56) References Cited

U.S. PATENT DOCUMENTS

| 7,242,499 | B2 * | 7/2007 | Kanda et al. ................. 358/1.16 |
| 7,577,857 | B1 | 8/2009 | Henderson et al. | |
| 2008/0304519 | A1 * | 12/2008 | Koenen et al. ................. 370/477 |
| 2010/0115307 | A1 | 5/2010 | Diab | |
| 2011/0044339 | A1 * | 2/2011 | Kotalwar et al. .............. 370/392 |
| 2012/0041970 | A1 * | 2/2012 | Ghosh et al. .................. 707/769 |
| 2012/0209802 | A1 | 8/2012 | Mehrotra et al. | |

OTHER PUBLICATIONS

U.S. Appl. No. 13/452,448, filed Apr. 20, 2012, Mehrotra, Gaurav et al.
"U.S. Appl. No. 13/452,448 Office Action", Feb. 1, 2013 , 34 pages.
"Bandwidth Broker", *Wikipedia* http://en.wikipedia.org/wiki/Bandwidth_Broker (Date Obtained from the Internet: Aug. 10, 2010) Last Modified: Oct. 13, 2009 , 2 pages.
"Link aggregation", *Wikipedia* http://en.wikipedia.org/wiki/Link_aggregation (Date Obtained from the Internet: Aug. 10, 2010) Last Modified: Aug. 9, 2010 , 6 pages.

(Continued)

*Primary Examiner* — Andrew Lai
*Assistant Examiner* — Jamaal Henson
(74) *Attorney, Agent, or Firm* — DeLizio Gilliam, PLLC

(57) ABSTRACT

A data query instruction for execution is received, wherein execution of the data query instruction is to cause a data transfer into or from a data warehouse. The data warehouse includes data servers that are communicatively coupled for data transfer through a link aggregation group having at least two data links. Responsive to receiving the data query instruction and prior to or at least partially overlapping with execution of the data query instruction to cause the data transfer, which of the number of data servers are to receive or transmit data as part of the data transfer is identified; for each of the identified data servers, a minimum number of the at least two data links that are needed for the data transfer are identified; and if inactive, the minimum number of the at least two data links for each of the identified data servers are activated.

15 Claims, 8 Drawing Sheets

(56) References Cited

OTHER PUBLICATIONS

Barroso, Luiz A. et al., "The Case for Energy-Proportional Computing", *IEEE Computer* http://citeseerx.ist.psu.eduiviewdoc/download?doi=10.1.1.128.5419&rep=rep 1 &type=pdf (Date Obtained from the Internet: Aug. 10, 2010) Dec. 2007, pp. 33-37.

Bash, Cullen et al., "Cool Job Allocation: Measuring the Power Savings of Placing Jobs at Cooling-Efficient Locations in the Data Center", *2007 Usenix Annual Technical Conference*, Jun. 17-22, 2007, Santa Clara, CA, USA http://www.hpl.hp.com/techreports/2007/Hpl-2007-62.pdf (Date Obtained from the Internet: Aug. 10, 2010) Jun. 2007, 11 pages.

Bohrer, Pat et al., "The Case for Power Management in Web Servers", *Power Aware Computing* http://citeseerx.ist.psu.edu/viewdoc/download?doi=10.1.1.24.6856&rep=rep 1 &type=pdf (Date Obtained from the Internet: Aug. 10, 2010) Jan. 2002, 31 pages.

Cisco, , "Ethernet Power Consumption for Cisco Switches", http://www.cisco.com/en/US/prod/collateral/switches/ps5718/ps6406/presentation_c97-466563.pdf (Date Obtained from the Internet: Aug. 10, 2010) 2008, 12 pages.

Fichera, Richard et al., "Power and Cooling Heat Up the Data Center: Maximizing Efficiency Yields Both Pragmatic and Social Benefits", *Forrester Research* hftp://www.forrester.com/Research/Document/Excerpt/0,7211,38746,00.html (Date Obtained from the Internet: Aug. 10, 2010) Mar. 8, 2006, 2 pages.

Fisher, Will et al., "Greening Backbone Networks: Reducing Energy Consumption by Shutting Off Cables in Bundled Links", *ACM SIGCOMM Workshop on Green Networking*, New Delhi, India http://www.cs.princeton.edui—msuchara/publications/Green-NetsBundles.p.df Aug. 30, 2010, 7 pages.

Gartner, Inc., , "Gartner Says a Green Data Centre Means More than Energy Efficiency", http://www.gartner.com/it/page.jsp?id=781012&format=print (Date Obtained from the Internet: Aug. 10, 2010) Oct. 2008, 2 pages.

Heller, Networks"Design and Brandon et al., "ElasticTree: Saving Energy in Data Center in *Proceedings of the 7th USENIX Symposium on Networked System Implementation* (*NSDI*) Apr. 2010 http://www.usenix.org/events/nsdi10/tech/full_papers/heller.pdf, 16 pages.

IBM, , "IBM Project Big Green Tackles Global Energy Crisis", http://www-03.ibm.com/press/us/en/pressrelease/24395.wss (Date Obtained from the Internet: Aug. 10, 2010) Jun. 11, 2008, 6 pages.

IBM, , "IBM Unveils Plan to Combat Data Center Energy Crisis; Allocates $1 Billion to Advance "Green" Technology and Services", http://www-03.ibm.com/press/us/en/pressrelease/21524.wss (Date OBtained from the Internet: Aug. 10, 2010) May 10, 2007, 6 pages.

Syskonnect, , "Link Aggregation according to IEEE 802.3ad", http://legacyweb.triumf.ca/canarie/amsterdam-test/References/wp-lag-e.pdf (Date Obtained from the Internet Aug. 10, 2010) Apr. 4, 2002, 22 pages.

\* cited by examiner

POWER MANAGEMENT IN LINK AGGREGATION FOR DATA TRANSMISSION

BACKGROUND

Embodiments of the inventive subject matter generally relate to the field of data transmission, and, more particularly, to power management in link aggregation for movement for data transmission.

Link aggregation relative to computer networking includes a network configuration having multiple network cables and ports in parallel. Other terms for link aggregation include Ethernet bonding, Network Interface Card (NIC) teaming, port channel, link bundling, EtherChannel, Multi-Link Trunking (MLT), NIC bonding, network bonding and Network Fault Tolerance (NFT). Link aggregation is used to increase link speed beyond the limits of any single cable and port (i.e., bandwidth limitations). Link aggregation can also be used to increase redundancy for higher availability. One standard for link aggregation includes Institute of Electrical and Electronics Engineers (IEEE) 802.1AX standard.

SUMMARY

Embodiments include a computer program product and an apparatus for processing a data query instruction. The computer program product using a computer readable storage medium having computer usable program code wherein in response to execution the computer usable program code is configured to perform operations. The apparatus comprises a processor, a data locator module and a power management module. The data locator module and the power management module are operable to execute on the processor to perform operations. The operations comprise receiving a data query instruction for execution, wherein execution of the data query instruction is to cause a data transfer into or from a data warehouse. The data warehouse includes a number of data servers, wherein each of number of data servers are communicatively coupled for data transfer through a link aggregation group having at least two data links. Responsive to receiving the data query instruction and prior to or at least partially overlapping with execution of the data query instruction to cause the data transfer, the operations include determining that the data query instruction references data stored on one or more of the data servers. Also responsive to receiving the data query instruction and prior to or at least partially overlapping with execution of the data query instruction to cause the data transfer, the operations include identifying on which of the number of data servers the data referenced by the data query is stored or to be stored. Also responsive to receiving the data query instruction and prior to or at least partially overlapping with execution of the data query instruction to cause the data transfer, the operations include identifying, for each of the identified data servers, a minimum number of the at least two data links that are needed for the data transfer and activating, if inactive, the minimum number of the at least two data links for each of the identified data servers.

Embodiments include a computer program product and an apparatus for processing a data query instruction. The computer program product includes a computer readable storage medium having computer usable program code wherein in response to execution the computer usable program code is configured to perform operations. The apparatus comprises a processor, a data locator module and a power management module. The data locator module and the power management module are operable to execute on the processor to perform operations. The operations comprise receiving a data query instruction for execution, wherein execution of the data query instruction is to cause a data transfer into or from a data warehouse. The data warehouse comprises a number of data servers, wherein each of number of data servers are communicatively coupled for data transfer through a link aggregation group having at least two data links. Responsive to receiving the data query instruction and prior to or at least partially overlapping with execution of the data query instruction to cause the data transfer, the operations include determining that the data query instruction references data stored on one or more of the data servers. Also responsive to receiving the data query instruction and prior to or at least partially overlapping with execution of the data query instruction to cause the data transfer, the operations include identifying on which of the number of data servers the data referenced by the data query is stored or to be stored. Also responsive to receiving the data query instruction and prior to or at least partially overlapping with execution of the data query instruction to cause the data transfer, the operations include identifying, for each of the identified data servers and based on the amount of data that is part of the data transfer for each of the identified data servers, a minimum number of the at least two data links that are needed for the data transfer. Also responsive to receiving the data query instruction and prior to or at least partially overlapping with execution of the data query instruction to cause the data transfer, the operations include activating, if inactive, the minimum number of the at least two data links for each of the identified data servers, and deactivating, if active, at least one of the following: at least one of the at least two data links for each of the identified data servers that are not part of the data transfer and at least one of at least two data links of the number of data servers that are not identified as part of the data transfer.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
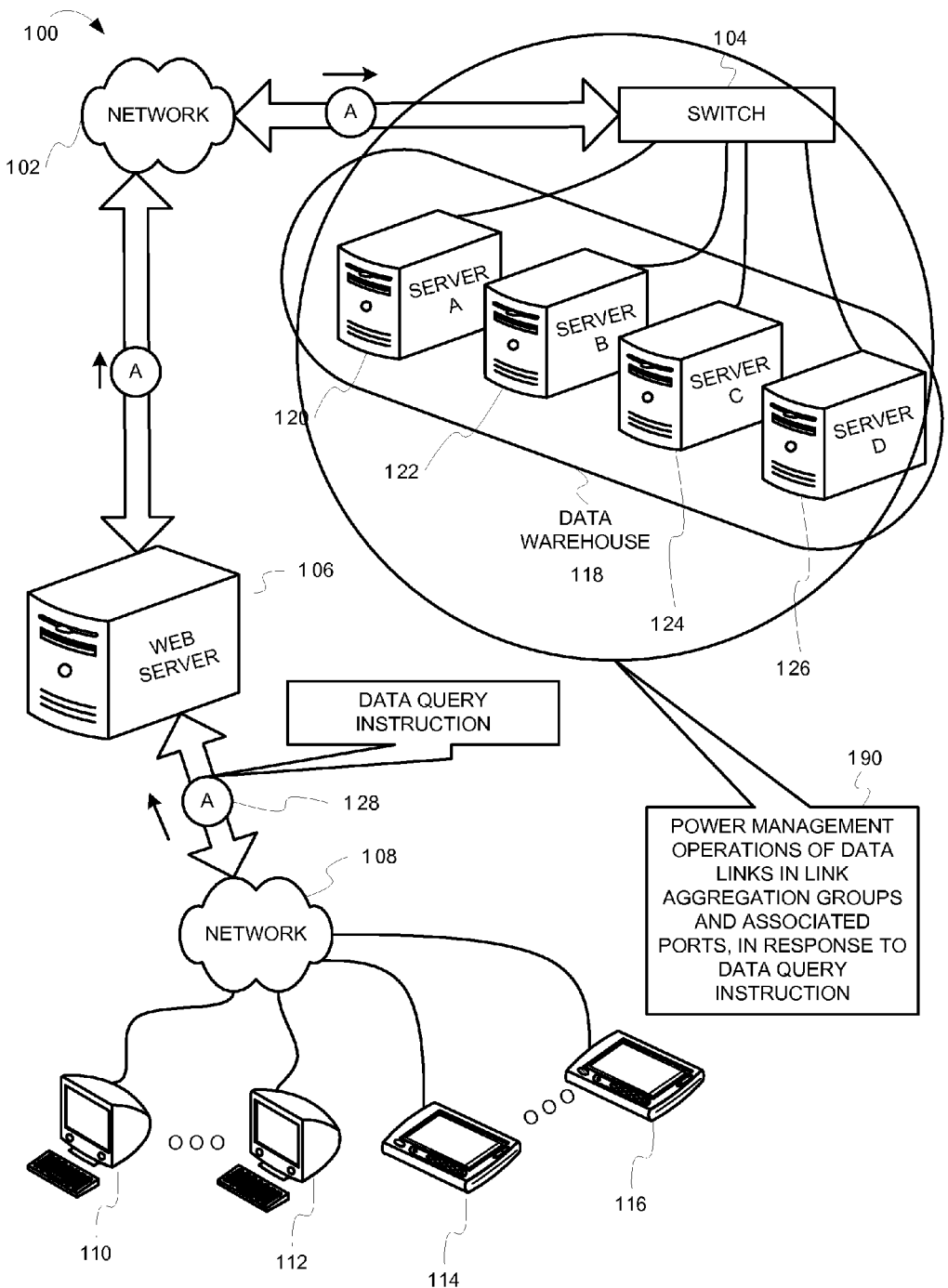
FIG. 1 depicts a system for power management of link aggregation for data transmission, according to some example embodiments.

The description that follows includes exemplary systems, methods, techniques, instruction sequences and computer program products that embody techniques of the present inventive subject matter. However, it is understood that the described embodiments may be practiced without these specific details. For instance, although examples refer to the IEEE 802.1AX standard for link aggregation, some example embodiments are applicable to any other type or standard for link aggregation. In other instances, well-known instruction instances, protocols, structures and techniques have not been shown in detail in order not to obfuscate the description.

Some example embodiments sense software instructions that will execute in the near future and estimate the amount of data to be transferred. Based on this estimation, some example embodiments power up a minimal number of links and power down the remaining unused portions of the network apparatus (e.g., links, ports, etc.). Such example embodiments provide good performance for network communications while providing power savings. Accordingly, some example embodiments are proactive relative to link aggregation and power consumption. In other words, some example embodiments do not wait for the network apparatus to unnecessarily consume power prior to moderating link usage. These example embodiments are in contrast to conventional systems. In particular, conventional systems only start to power down links after bandwidth usage has reached a particular lower threshold for a given time period. Additionally, these conventional systems can impact performance of the network communications. Specifically, these conventional systems generally initiate power up of powered-down links only after bandwidth usage has reached a particular higher threshold for a given time period. Conventional systems can require many cooling applications because of the amount of heat generated. These cooling applications can consume a large amount of energy. Some example embodiments do not allow components to remain hot (because of being in an operational state). Accordingly, the life of such components is prolonged.

In some example embodiments, historical data of software instructions is analyzed. Based on this analysis, the amount of data to be transferred and the time duration of the transfer can be predicted. Accordingly, a minimal number of links are powered up based on this analysis. Also, some example embodiments can proactively instruct the NIC controller or the Media Access Controller of the NIC card (that are to be used in the data transmission) to put these controllers in a full power state when a data intensive operation is executed. Additionally, some example embodiments can proactively instruct the PHY components of the servers and switches (that are to be used in the data transmission) to put these components in a full power state when a data intensive operation is executed. Some example embodiments can also proactively place these controllers and PHY components in a low power state if these controllers and PHY components are not required for the data transfer.

Thus, in response to analysis of the instructions that are to be executed, the state of the link (including associated components (e.g., NIC controllers, PHY components, etc.)) can change from full power state to a low power state, or vice versa. Therefore, the links and the different components associated therewith can be put in an appropriate power mode to affect high power savings.

Some example embodiments are particularly applicable to enterprise clouds. Software as a Service (SaaS) is a model of software deployment where an application is licensed for use as a service provided to customers on demand. Using SaaS can conceivably reduce up-front expense of software purchases, through less costly, on-demand pricing from hosting service providers. SaaS allows software vendors to control and limit use, prohibits copies and distribution, and facilitates the control of all derivative versions of their software. SaaS centralized control often allows the vendor or supplier to establish an ongoing revenue stream with multiple businesses and users without preloading software in each device in an organization. The SaaS software vendor may host the application on its own web server, download the application to the consumer device and disable the application after use or after the on-demand contract expires.

Data loss can essentially stop the operations of a running business and can cost millions to recover. The risks of losing valuable data to natural disaster, malicious attacks or man-made errors are very real and require protection in the form of data backup, storage, and recovery. Originally, data was used to help achieve operational goals, run the business and help identify the future direction and success of the company. However, new government regulations and guidelines are a key driving force in how and why data is being retained, as these regulations and guidelines are now requiring organizations to retain and control information for very long periods of time. Therefore, Information Technology (IT) managers are trying to store vast quantities of data, for the lowest possible cost; and to meet the new regulatory requirements for data retention and protection. Hence cloud deployments distributed over the globe with remote backup sites are a common configuration. Maintenance windows involve load or batch inserts of data onto a data storage server as well as backups of data in such a server. Accordingly, some example embodiments are particularly useful in these various data transfers.

Figure 3:
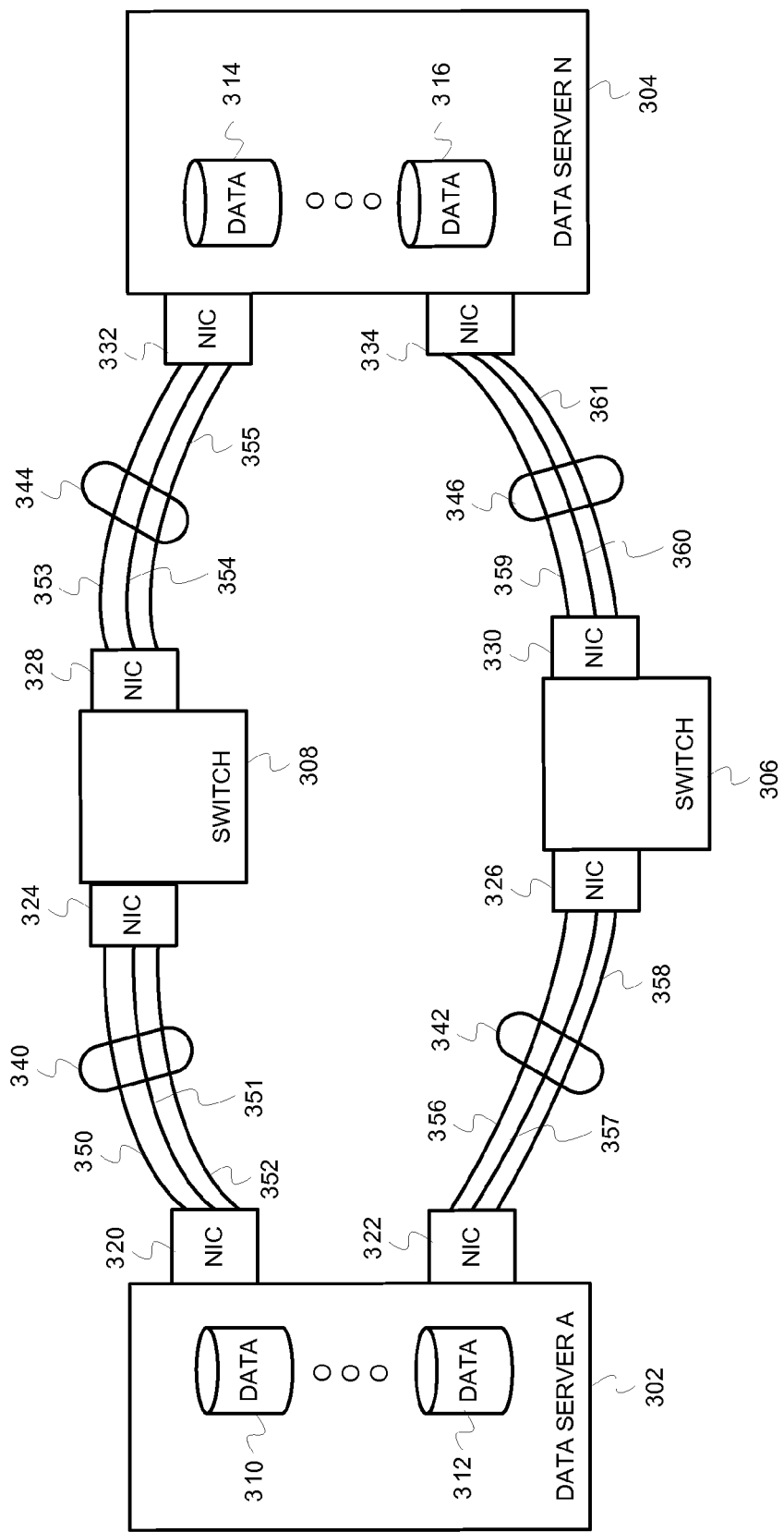
FIG. 3 depicts a more detailed block diagram of a data warehouse having link aggregation for data transmission, according to some other example embodiments.

FIG. 1 depicts a system for power management of link aggregation for data transmission, according to some example embodiments. In particular, FIG. 1 depicts a system 100 that includes a number of client devices (a client device 110, a client device 112, a client device 114, a client device 116, etc.). The client devices can be any type of computers that are communicatively coupled to a network 108. A web server 106 is also communicatively coupled to the network 108. In this example, the web server 106 is also communicatively coupled to a network 102. Also, a switch 104 is communicatively coupled to the network 102. The switch 104 can be any type of device that receives data traffic and forwards the data traffic to network devices coupled thereto. In this example, the switch 104 is also communicatively coupled to a number of data servers that together are defined as a data warehouse 118. In this example, the data servers in the data warehouse 118 include a data server A 120, a data server B 122, a data server C 124, and a data server D 126, which can be representative of any number of data servers. Although not shown in FIG. 1, each of the data servers can be communicatively coupled together through one or more other switches. An example of such a configuration is shown in FIG. 3, which is further described below. In some example embodiments, the data links between among the data servers, and the switch 104 and the data servers are configured in data link aggregation groups having two or more data links.

Figure 2:
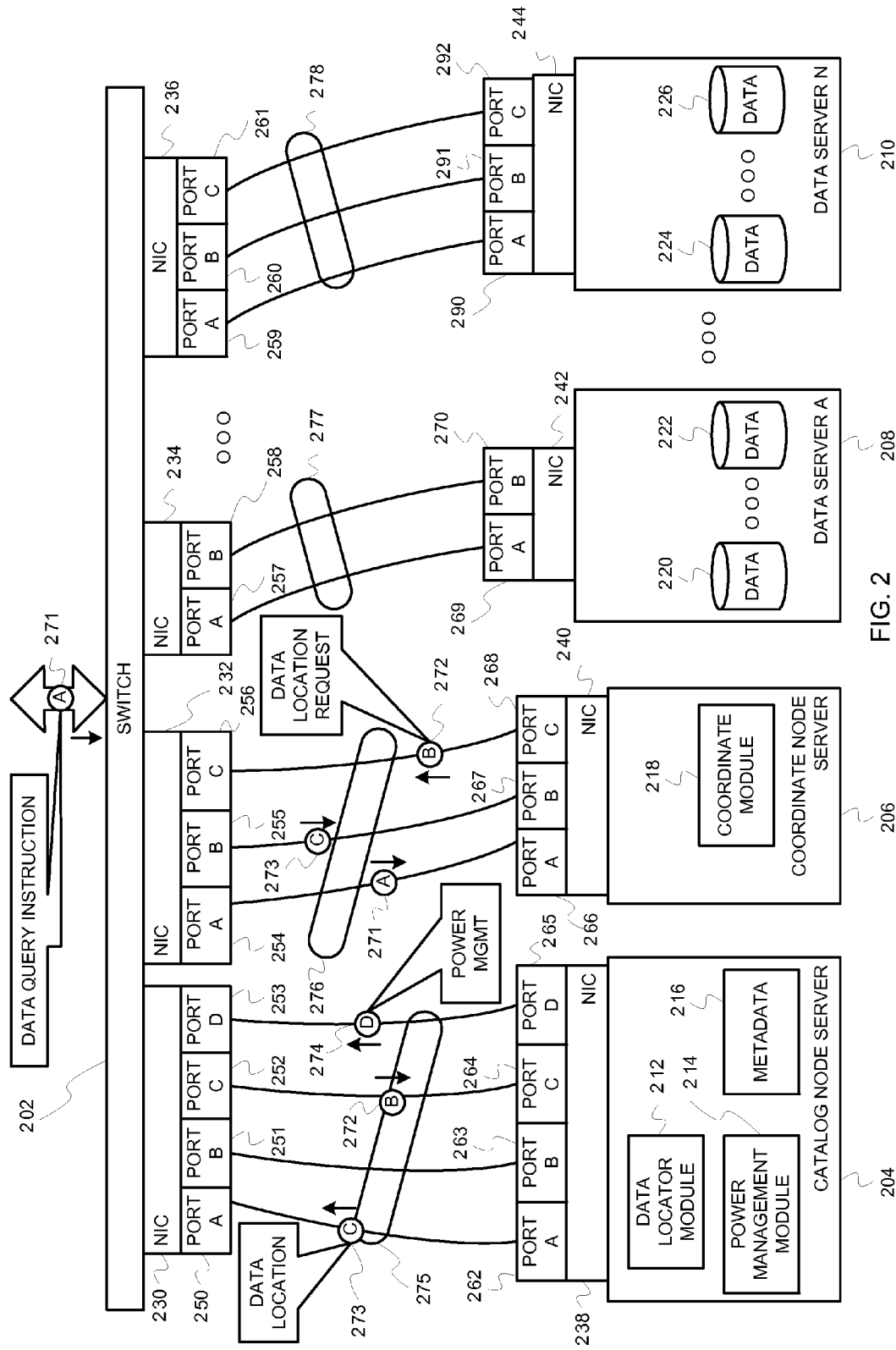
FIG. 2 depicts a more detailed block diagram of a data warehouse and associated switch having link aggregation for data transmission, according to some example embodiments.

In this example, one of the client devices (e.g., the client device 110) executes an instruction to perform a data query instruction 128 for accessing data from the data warehouse 118. For example, the client device 110 can execute a query to read data from one or multiple data servers of the data warehouse 118. The data can be transferred from one or multiple of the data servers of the data warehouse 118 back to the client device 110, a different client device, a different server or any other device communicatively coupled to the data warehouse 118. As shown, the data query instruction 128 is transmitted over the network 108 and the network 102 to the switch 104. The switch 104 forwards the data query instruction 128 to one of the data servers known as a coordinate node server. An example configuration of the data servers and the data links coupled between is shown in FIGS. 2-3, which is further described below. In response to the data query instruction, a module in the coordinate note server causes a number of operations to be performed that include power management of the data links in the data link aggregation groups as well as power management of the ports coupled to such data links—shown as 190. Based on this data query instruction 128, this can include activation of data links and ports that are used for the data transfer and deactivation of data links and ports that are not used for the data transfer. Accordingly, some example embodiments sense software instructions that will execute in the near future and estimate the amount of data to be transferred. Based on this estimation, some example embodiments power up a minimal number of links and power down the remaining unused portions of the network apparatus (e.g., links, ports, etc.). Such example embodiments provide good performance for network communications while providing power savings. Accordingly, some example embodiments are proactive relative to link aggregation and power consumption. In other words, some example embodiments do not wait for the network apparatus to unnecessarily consume power prior to moderating link usage.

FIGS. 2 and 3 depict more detailed block diagrams of the link aggregation groups between the switch and data servers and between the data servers. FIG. 2 depicts a more detailed block diagram of a data warehouse and associated switch having link aggregation for data transmission, according to some example embodiments. In particular, FIG. 2 depicts a more detailed block diagram of the switch 104 and the data servers in the data warehouse 118 of FIG. 1. In Figure FIG. 2 includes a switch 202 that corresponds to the switch 104 of FIG. 1. FIG. 2 also includes a catalog node server 204, a coordinate node server 206, a data server A 208 and a data server N 210, which can correspond to the data server A 120, the data server B 122, the data server C 124, and the data server D 126 of FIG. 1. The data server A 208 and the data server N 210 are representative of any number of data servers. Also, while the catalog node server 204 and the coordinate node server 208 have additional functionally, these servers can also store data similar to the data server A 208 and the data server N 210.

The data server A 208 includes a number of databases stored on one or more nonvolatile machine-readable media (a database 220 and a database 222). The data server N 210 also includes a number of databases stored on one or more nonvolatile machine-readable media (a database 224 and a database 226). Although not shown, the catalog node server 204 and the coordinate node server 206 can also include a number of databases stored on one or more nonvolatile machine-readable media.

The catalog node server 204 includes a data locator module 212, a power management module 214 and metadata 216. The data locator module 212 and the power management module 214 can be software, firmware, hardware or a combination thereof. The metadata 216 can be stored in any type of machine-readable medium. The metadata 216 includes data that defines the location of the various data stored in the data warehouse. For example for a particular set of data, the metadata can define its location relative to the server, the database, the tables, etc. Using the metadata 216, the data locator module 212 can provide the data locations of the data stored in the data warehouse. The power management module 214 can issue instructions to power up and power down different data links and ports based on the particular data query instruction. For example, if the data query instruction is to cause retrieval of data from the data server A 208, the power management module 214 can issue instructions t power up a specific number of data links and associated ports for the NIC 242 to handle the transfer of data. Also, the power management module 214 can also power down (e.g., put into a low power state) the unused data links and ports for the data server A 208 and the data links and ports for the data server N 210.

The coordinate node server 218 includes a coordinate module 218, which can be software, firmware, hardware or a combination thereof. As further described below, the coordinate module 218 receives the data query instruction from the switch 202 and communicates with the catalog node server 204 to determine the location of the requested data and to receive the data from the data server storing the requested data. The coordinate module 218 can then return the requested data to the switch 202 for data transfer.

As shown, the switch 202, the catalog node server 204, the coordinate node server 206, the data server A 208 and the data server N 210 include Network Interface Controllers (NICs) having a number of ports. The switch 202 includes a NIC 230, a NIC 232, a NIC 234, and a NIC 236. The NIC 230 includes a port A 250, a port B 251, a port C 252, and a port D 253. The NIC 232 includes a port A 254, a port B 255, and a port C 256. The NIC 234 includes a port A 257, and a port B 258. The NIC 236 includes a port A 259, a port B 260, and a port C 261. The catalog node server 204 includes a NIC 238 having a port A 262, a port B 263, a port C 264, and a port D 265. The coordinate node server 206 includes a NIC 240 having a port A 266, a port B 267, and a port C 268. The data server A 208 includes a NIC 242 having a port A 269, and a port B 270. The data server N 210 includes a NIC 244 having a port A 290, a port B 291, and a port C 292.

There is a link aggregation group between the switch 202 and each of the catalog node server 204, the coordinate node server 206, the data server A 208 and the data server N 210. There is a link aggregation group 275 between the NIC 230 of the switch 202 and the NIC 238 of the catalog node server 204. The link aggregation group 275 includes four data links (a data link between the port A 250 of the switch 202 and the port A 262 of the catalog node server 204; a data link between the port B 251 of the switch 202 and the port B 263 of the catalog node server 204; a data link between the port C 252 of the switch 202 and the port C 264 of the catalog node server 204; and a data link between the port D 253 of the switch 202 and the port D 265 of the catalog node server 204). There is a link aggregation group 276 between the NIC 232 of the switch 202 and the NIC 240 of the coordinate node server 206. The link aggregation group 276 includes three data links (a data link between the port A 254 of the switch 202 and the port A 266 of the coordinate node server 206; a data link between the port B 255 of the switch 202 and the port B 267 of the coordinate node server 206; and a data link between the port C 256 of the switch 202 and the port C 268 of the coordinate node server 206). The link aggregation group 277 includes two data links (a data link between the port A 257 of the switch 202 and the port A 269 of the data server A 208; and a data link between the port B 258 of the switch 202 and the port B 270 of the data server A 208). The link aggregation group 278 includes three data links (a data link between the port A 259 of the switch 202 and the port A 290 of the data server N 210; a data link between the port B 260 of the switch 202 and the port B 291 of the data server N 210; and a data link between the port C 261 of the switch 202 and the port C 292 of the data server N 210).

FIG. 2 also includes a number of data transmissions. In this example, the data transmissions between the different servers are communicated through the server 202. However, in some other example embodiments, these different servers can be directly communicatively coupled to each other through one or more switches (see FIG. 3 described below). Accordingly, the data transmissions described in reference to FIG. 2 between the different servers can be transmitted over the data links shown in FIG. 3.

The transmission of a data query instruction 271 can be received from any type of device (e.g., one of the client devices of FIG. 1). The data query instruction 271 is sent to the coordinate node server 206. In this example, the data query instruction 271 is transmitted along the data link between the port A 254 of the switch 202 and the port A 266 of the coordinate node server 206. The coordinate module 218 receives the data query instruction 271. In response, the coordinate module 218 transmits a data location request 272 to the catalog node server 204. In response and based on the metadata 216, the data locator module 212 determines the data location within the data servers, the amount of data, the amount of data needed for the data transfer, etc. The power management module 214 receives this information (the data location within the data servers, the amount of data, the amount of data needed for the data transfer, etc.) and issues power management instructions 274 to different components. The power management instructions 274 can include instructions to the NICs of the switch 202 and the different servers to power on the ports and data links needed for the data transfer. The power management instructions 274 can also include instructions to the NICs of the switch 202 and the different servers to power on the ports and data links not needed for the data transfer. For example, if data is located in the data server N 210 and two data links are needed based on the amount of data being requested, the power management instructions can include 1) instructions to the data server A 208 to power down the port A 269 and the port B 270 of the NIC 242 and the data links coupled thereto; 2) instructions to the switch 202 to power down the port A 257 and the port B 258 of the NIC 234; 3) instructions to the data server N 210 to power on the port A 290 and the port B 291 of the NIC 244 and the data links coupled thereto; 4) instructions to the data server N 210 to power down the port C 292 of the NIC 244 and the data link coupled thereto; and 5) instructions to the switch 202 to power down the port C 261 of the NIC 236.

Also in response and based on the metadata 216, the data locator module 212 returns a data location 273 to the coordinate module 218. The coordinate module 218 can then issue requests for transferring data to the servers that are storing the data to be transferred based on the data query instruction 271. These requests can include instructions to transfer data between data servers (e.g. indexing data for the actual data, etc.) and transfer of the actual data back to the coordinate node server 206. Upon receipt of the actual data, the coordinate module 218 can then transfer the actual data to the switch 202 over one or more of the data links in the link aggregation group 276. The switch 202 can then output the actual data to the requesting device. The data location 273 can also include instructions on what ports and data links to use based on the power management instructions from the power management module 214.

FIG. 3 depicts a more detailed block diagram of a data warehouse having link aggregation for data transmission between two data servers, according to some example embodiments. With reference to FIG. 2, instead of data communications between two servers being transmitted through the switch 202, the data communications between two servers are configured as shown in FIG. 3. In particular, the two data servers of FIG. 3 can represent any of two of the catalog node server 204, the coordinate node server 206, the data server A 208 and the data server N 210 of FIG. 2.

FIG. 3 includes a data server A 302 and a data server N 304. The data server A 302 includes a number of databases stored on one or more nonvolatile machine-readable media (a database 310 and a database 312). The data server N 304 also includes a number of databases stored on one or more nonvolatile machine-readable media (a database 314 and a database 316). In this example configuration, the data server A 302 is communicatively coupled to the data server N 304 through two different switches using link aggregation groups. In some other example embodiments, the data server A 302 is communicatively coupled to the data server N 304 through less or more switches and link aggregation groups.

FIG. 3 also includes a switch 306 and a switch 308. The switch 306 includes a NIC 326 and a NIC 330. The switch 308 includes a NIC 324 and a NIC 328. The data server A 302 includes a NIC 320 and a NIC 322. The data server N 304 includes a NIC 332 and a NIC 334. Although not shown in FIG. 3, the NICs can include ports associated with each of the data links coupled thereto—see FIG. 2. The NIC 320 is coupled to the NIC 324 through a link aggregation group 340 that includes a data link 350, a data link 351 and a data link 352. The NIC 328 is coupled to the NIC 332 through a link aggregation group 344 that includes a data link 353, a data link 354 and a data link 355. The NIC 322 is coupled to the NIC 326 through a link aggregation group 342 that includes a data link 356, a data link 357 and a data link 358. The NIC 333 is coupled to the NIC 334 through a link aggregation group 346 that includes a data link 359, a data link 360 and a data link 361.

Similar to FIG. 2 above, the power management module 214 of FIG. 2 can power up and power down the data links and associated ports of the NICs between two data servers shown in FIG. 3 based on where data is stored and the amount of data. For example, if there is no data transfer between two data servers, the data links and associated ports can be powered down. If there is a data transfer between two data servers such that only one link aggregation group is required, the data links and associated ports of the other link aggregation group can be powered down. For example, if the data links in the link aggregation groups 340 and 344 through the switch 308 have sufficient bandwidth to handle the data transfer between the data server A 302 and the data server N 304, the data links in the link aggregation groups 342 and 346 (along with the associated ports) can be powered down. Also, as described above, the data links in a link aggregation group can be individually managed relative to power. For example, if the data links 350 and 353 have sufficient bandwidth to handle the data transfer between the data server A 302 and the data server N 304, the data links 351, 352, 354, and 355 (along with associated ports) can be powered down. Additionally, the data links in the link aggregation groups 342 and 346 (along with the associated ports) can be powered down.

Figure 4:
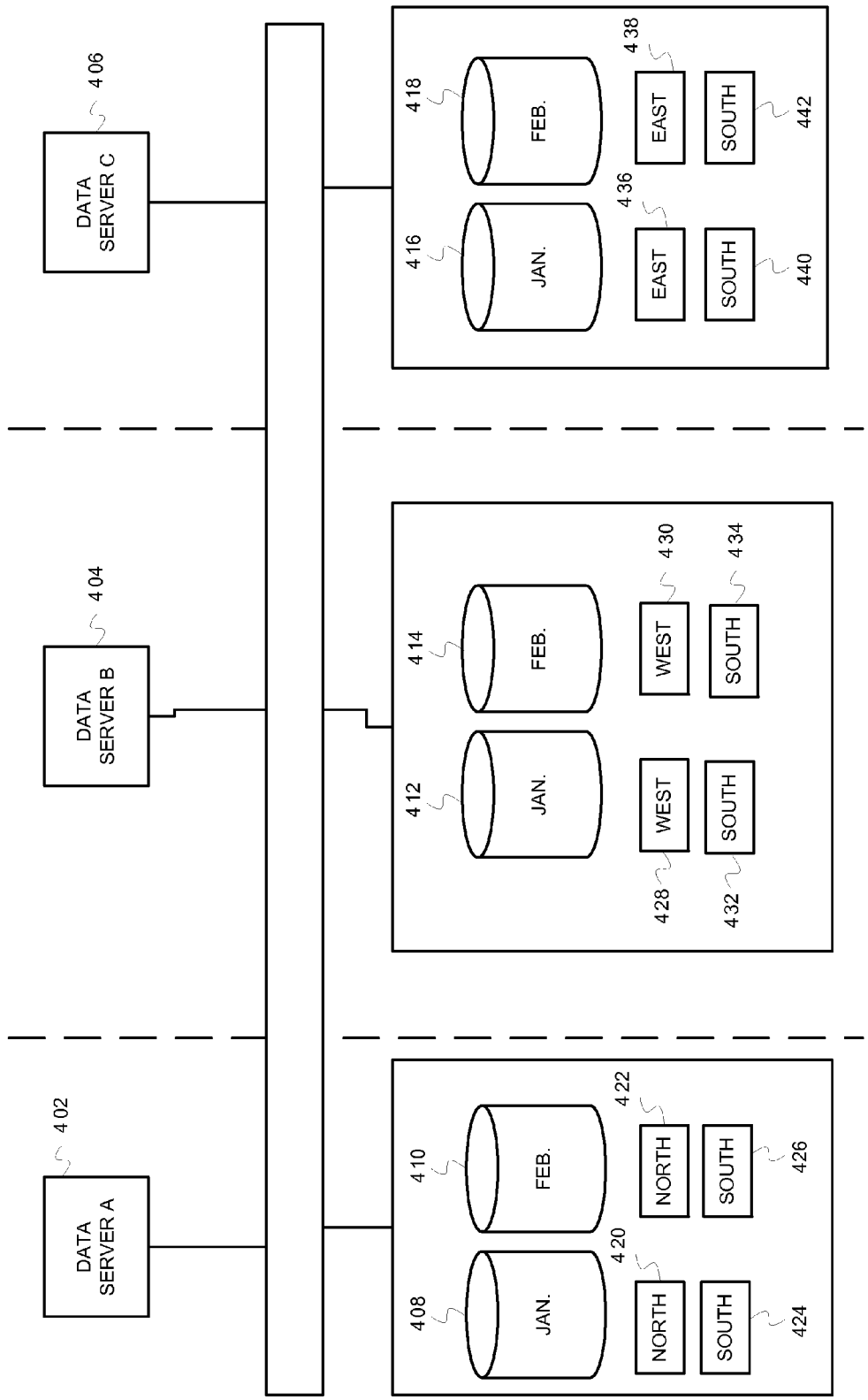
FIG. 4 depicts a more detailed block diagram of database partitioning used for determining power management of link aggregation for data transmission, according to some example embodiments.

FIG. 4 depicts a more detailed block diagram of database partitioning used for determining power management of link aggregation for data transmission, according to some example embodiments. The data in different tables has been partitioned across three different servers—a data server A 402, a data server B 404, and a data server C 406. In this example, these different data servers store reports (e.g., expense reports, travel reports, profit reports, etc.) for January and February of a given year. Also, the reports are stored in different tables based on geographic regions. In this example, there are three data servers and four different geographic regions (North, South, East, and West). Therefore, the reports for three of the geographic regions (North, West, and East) are stored in the three different data servers. The reports for the remaining geographic region (South) is stored across all three data servers. The geographic regions can be in reference to any type of region (e.g., city, state, country, etc.).

In particular, the data server A 402 includes reports for January (408) for the North geographic region (database tables 420) and for the South geographic region (database tables 424). The data server A 402 also includes reports for February (410) for the North geographic region (database tables 420) and for the South geographic region (database tables 424). The data server B 404 includes reports for January (412) for the West geographic region (database tables 428) and for the South geographic region (database tables 432). The data server B 404 also includes reports for February (414) for the West geographic region (database tables 430) and for the South geographic region (database tables 434). The data server C 406 includes reports for January (416) for the East geographic region (database tables 436) and for the South geographic region (database tables 440). The data server C 406 also includes reports for February (418) for the East geographic region (database tables 438) and for the South geographic region (database tables 442).

The reports in the tables for the South geographic region across the different data servers can be distributed such that there is one copy of a given report. Alternatively, the data servers can be configured such that the reports in the tables for the South geographic region are duplicates of each other. Accordingly, the database tables 424, 432, and 440 can store the same reports for the South geographic region for January. Similarly, the database tables 426, 434, and 442 can store the same reports for the South geographic region for February.

In operation, power management for the data links and ports coupled to the data servers can be configured based on what reports are being accessed. For example, if a given data query is accessing reports for January for the East geographic region, one or more data links and associated ports that are communicatively coupled to the data server C 406 are powered on. Also, the data links and associated reports that are communicatively coupled to the data server A 402 and the data server B 404 can be powered down. Accordingly, the data query instruction can be analyzed to determine a power management strategy for the different data links and associated ports.

Figure 5:
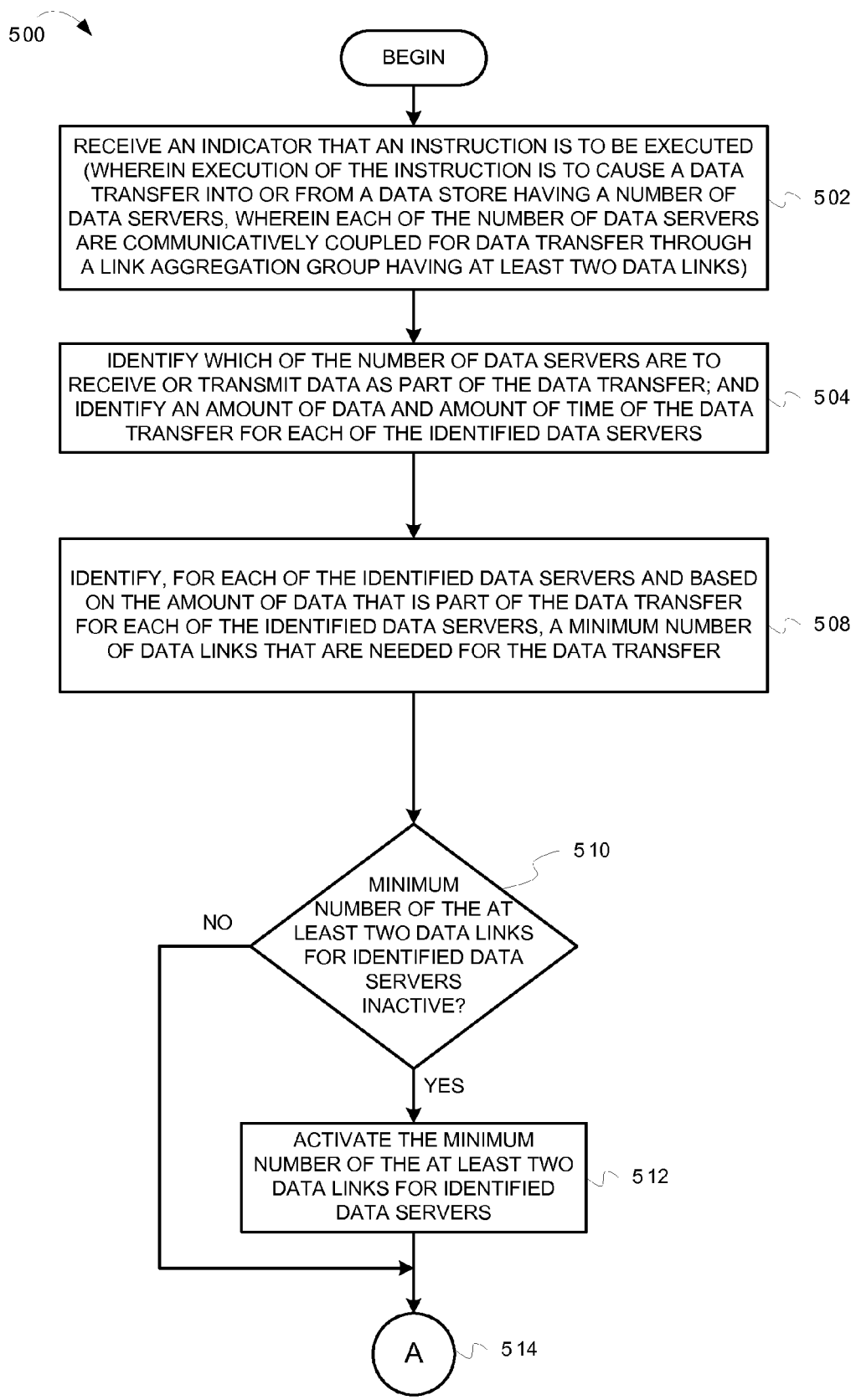
FIGS. 5-7 depict flowcharts for power management of link aggregation for data transmission, according to some example embodiments.
Figure 6:
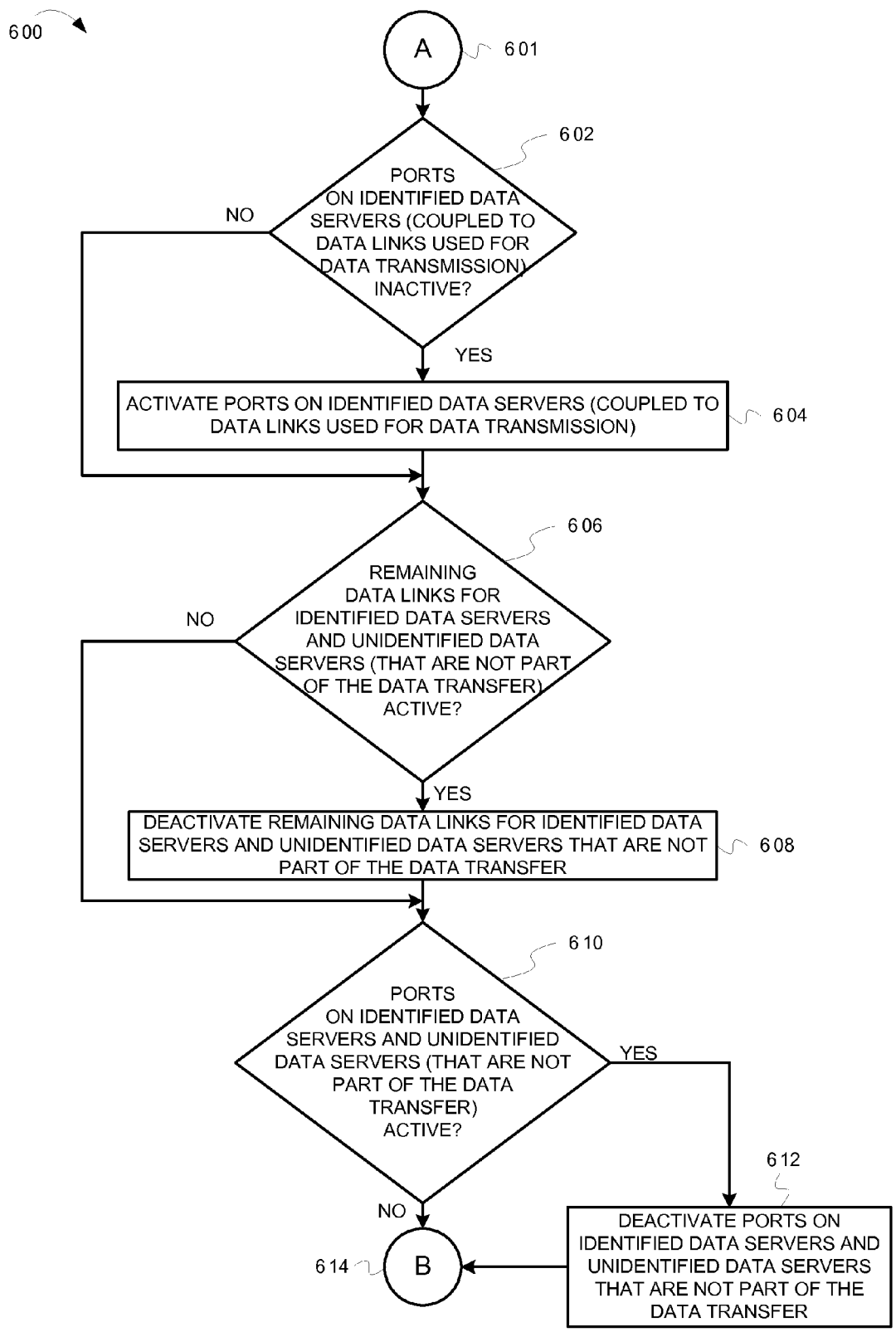
Figure 7:
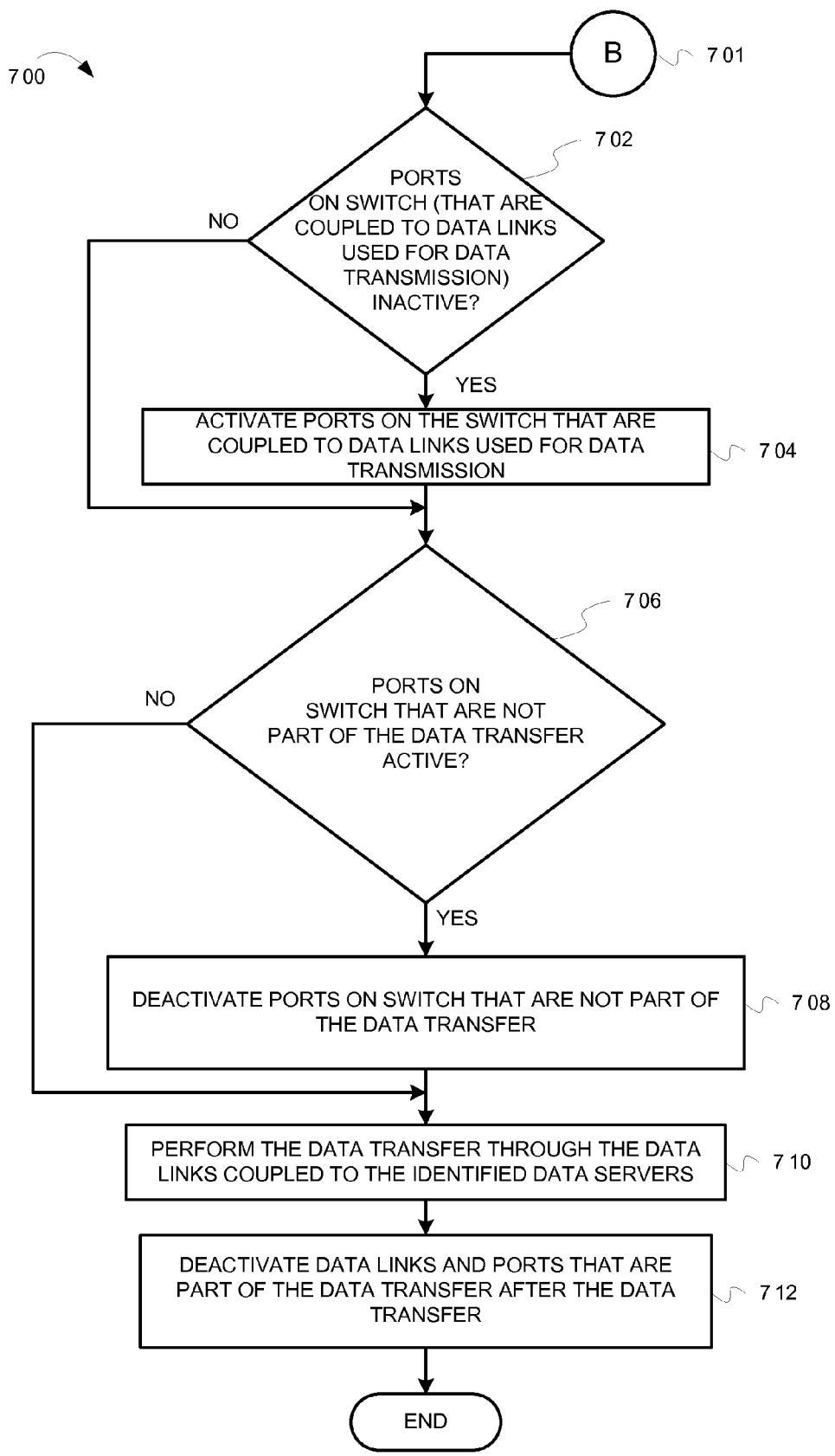

Flowcharts of operations, according to some example embodiments, are now described. FIGS. 5-7 depicts flowcharts for power management of link aggregation for data transmission, according to some example embodiments. FIG. 5 depicts a flowchart 500. FIG. 6 depicts a flowchart 600 that is a continuation of the flowchart 500 at continuation point A. FIG. 7 depicts a flowchart 700 that is a continuation of the flowchart 600 at continuation point B. The operations of the flowcharts are described with reference to FIGS. 1-3. In this description, the operations of the flowcharts are performed by the coordinate module 218 in the coordinate node server 206 and the data locator module 212 and power management module 214 in the catalog node server 204 shown in FIG. 2. Alternatively or in addition, the operations of the flowcharts can be performed by modules within the switch 202, the other servers, etc. shown in FIG. 2.

At block 502, the coordinate module 218 receives an indicator that an instruction is to be executed that is to cause a data transfer into or from a data store having a number of data servers, wherein each of the number of data servers are communicatively coupled for data transfer through a link aggregation group having at least two data links. With reference to FIGS. 1-2, the data query instruction can be transmitted from a client device over the network to the switch 104/202. With reference to FIG. 2, the coordinate module 218 receives the data query instruction 271 from the switch 202. The operations of the flowchart 500 continue at block 504.

At block 504, the data locator module 212 identifies which of the number of data servers are to receive or transmit data as part of the data transfer and identify an amount of data and the amount of time of the data transfer for each of the identified data servers. With reference to FIG. 2, the coordinate module 218 transmits the data location request 272 to the data locator module 212 on the catalog node server 204 (in response to receiving the data query instruction 271. In some example embodiments, the data locator module 212 can execute instructions that create an access plan. The access plan can estimate the amount of data that will be transferred as well as the physical locations that will be involved. For example, the access plan can require exchange of data between data servers within the data warehouse and between the data servers and the switch 202 that returns the data back over the network. The exchange of data between data servers can be transferred over a configuration as shown in FIG. 3. The access plan can specify the order of operations for accessing this data. Also, the access plan provides statistics for selected tables, indexes, columns, etc.; properties for operators; global information such as table space and function statistics; and configuration parameters relevant to optimization for data transfer. In some example embodiments, a same data can be stored in multiple locations in the data warehouse. Also, a same data can be access multiple ways. Accordingly, an access plan can provide the most efficient way to access this data.

For example, here is an access plan for a particular operation wherein the database estimates the amount of data that will be analyzed and filtered to satisfy the operation:

```
        156174
        INSERT
        (2)
        1174.79
        683.512
        /----+----\
   156174         937044
   IXSCAN         TABLE: DB2INFO
   (3)            MQT1000000083T16
   149.828        Q1
   35.3022
      |
    937044
    INDEX: DB2INFO
    IDX1000000083T1603
    Q1
```

In this example access plan, there are two choices shown as two branches of a tree of the access plan: 1) 156174 and 2) 937044. These two values are the estimated cost (in terms time, processor cycles, Input/Outputs (I/O), etc. In this example, the 156174 choice is a lesser cost in comparison to the 937044 choice (a higher value). Therefore, the 156174 is selected.

Below is an example query to check an access plan:
db2exfmt -d SAMPLE -g TIC -w -1 -n % -s % -#0-o prod_sample_exfmt.txt The result of this example query is set forth below:
RETURN: (Return Result)
Cumulative Total Cost: 57.6764
Cumulative CPU Cost: 191909
Cumulative I/O Cost: 2
Cumulative Re-Total Cost: 5.37264
Cumulative Re-CPU Cost: 134316
Cumulative Re-I/O Cost: 0
Cumulative First Row Cost: 26.9726

Estimated Buffer pool Buffers: 2

Accordingly, the total cost, the CPU cost, the I/O cost, etc. can be provided for a given access plan to evaluate a given access plan. Also, to find the underlying hardware where the data is located (e.g., on which the table's containers span), the following operation can be executed:

db2look -d <database_name> -t <table_name> -a -e -c

This operation identifies which of the data servers stores the data that is being accessed as well as the amount of data. The above-illustrated example is one technique for determining the amount of data, where the data is located and a plan for accessing such data. Other techniques can be used for making these determinations. The operations of the flowchart 500 continue at block 508.

At block 508, the power management module 214 identifies, for each of the identified data servers and based on the amount of data that is part of the data transfer for each of the identified data servers, a minimum number of data links that are needed for the data transfer. In particular, each data link has a defined bandwidth. Accordingly, the amount of data being transferred can determine how many data links are required based on the defined bandwidths of the data links. Also, this identification regarding the number of data links is made for each data transfer that is part of the data query operation. In particular, the data query operation can require multiple exchanges of data among the data server as well as a data transfer of the data requested from the coordinate node server back to the switch 202. For example, one data server can store the indexing for data stored in a different data server. Accordingly, the data links will be determined between these two servers. Also, in some example embodiments, the data requested by the data query operation is provided to the coordinate node server 206. The coordinate node server 206 then transfers the data to the switch 202. The switch 202 can then output the data requested. In such an example, the power management module 214 also determines the number of data links between the data server having the actual data and the coordinate node server 206, and the number of data links between the coordinate node server 206 and the switch 202. The operations of the flowchart 500 continue at block 510.

The operations in the remaining blocks of FIG. 5, the blocks of FIG. 6, and the blocks 702-708 of FIG. 7 are performed by the power management module 214 to activate (power on) the data links and associated ports in the data warehouse that are part of the data transfer and to deactivate (power down or place into a low power state) the data links and associated ports in the data warehouse that are not part of the data transfer.

At block 510, the power management module 214 determines whether the minimum number of data links for identified data servers inactive. With reference to FIGS. 2-3, the power management module 214 uses the access plan to determine if the data links that are to be used in the data transfer among the data servers and switches are currently inactive (powered off or in a low power state). In some example embodiments, the power management module 214 can request a status of the data links from the component controlling the data links. For example, a module (e.g., software, firmware, hardware, or a combination thereof) in the switches, the servers and/or the NICs that are communicatively coupled to a given data link can provide the status (active or inactive). If the minimum number of data links for the identified data servers are inactive, the operations of the flowchart 500 continue at block 512. Otherwise, the operations of the flowchart 500 continue at continuation point A 514, which is the transition point to the flowchart 600 of FIG. 6 at continuation point A 601.

At block 512, the power management module 214 activates the minimum number of data links for identified data servers. In particular, the power management module 214 can issue an instruction to the module in the switch, the servers and/or the NICs (described above) that is controlling these data links to activate such data links. In response, the module can power on the data links that are part of the data transfer. The operations of the flowchart 500 continue at continuation point A 514, which is the transition point to the flowchart 600 of FIG. 6 at continuation point A 601.

The operations of the flowcharts of FIGS. 5-7 continue at the flowchart 600 of FIG. 6. From the continuation point 601, the operations of the flowchart 600 continue at block 602.

At block 602, the power management module 214 determines whether ports on identified data servers (that are coupled to the data links for data transmission) are inactive. With reference to FIGS. 2-3, the power management module 214 can request a status of these ports from the component controlling these ports. For example, a module (e.g., software, firmware, hardware, or a combination thereof) in the associated NICs can provide the status (active or inactive). If the ports on the identified data servers (that are coupled to the data links for data transmission) are inactive, the operations of the flowchart 600 continue at block 604. Otherwise, the operations of the flowchart 600 continue at block 606.

At block 604, the power management module 214 activates ports on identified data servers (coupled to data links used for data transmission). In particular, the power management module 214 can issue an instruction to the module in the associated NICs (described above) that are controlling these ports to activate such ports. In response, the module can power on the ports that are part of the data transfer. The operations of the flowchart 600 continue at block 606.

At block 606, the power management module 214 determines whether the remaining data links for the identified data servers and unidentified data servers (that are not part of the data transfer) are active. In some example embodiments, the power management module 214 can request a status of the data links from the component controlling the data links. For example, a module (e.g., software, firmware, hardware, or a combination thereof) in the switches, the servers and/or the NICs that are communicatively coupled to a given data link can provide the status (active or inactive). If the remaining data links for the identified data servers and unidentified data servers (that are not part of the data transfer) are active, the operations of the flowchart 600 continue at block 608. Otherwise, the operations of the flowchart 600 continue at block 610.

At block 608, the power management module 214 deactivates remaining data links for identified data servers and unidentified data servers that are not part of the data transfer. In particular, the power management module 214 can issue an instruction to the module in the switch, the servers and/or the NICs (described above) that is controlling these data links to deactivate such data links. In response, the module can power down or place into a low power state the data links that are part of the data transfer. A low power state for a data link can be an idle or standby state, wherein the data link is not receiving any communication. In some example embodiments, if the data link is deactivated, the data link can be removed from the associated link aggregation group or completely powered down. The operations of the flowchart 600 continue at block 610.

At block 610, the power management module 214 determines whether the ports on identified data servers and unidentified data servers (that are not part of the data transfer) are active. With reference to FIGS. 2-3, the power management module 214 can request a status of these ports from the component controlling these ports. For example, a module (e.g., software, firmware, hardware, or a combination thereof) in the associated NICs can provide the status (active or inactive). If the ports on the identified data servers and unidentified data servers (that are not part of the data transfer) are active, the operations of the flowchart 600 continue at block 612. Otherwise, the operations of the flowchart continue at continuation point B 614, which is the transition point to the flowchart 700 of FIG. 7 at continuation point B 701.

At block 612, the power management module 214 deactivates ports on identified data servers and unidentified data servers that are not part of the data transfer. In particular, the power management module 214 can issue an instruction to the module in the associated NICs (described above) that are controlling these ports to deactivate such ports. In response, the module can power down or place into a low power state the ports that are not part of the data transfer. The operations of the flowchart 600 continue at continuation point B 614, which is the transition point to the flowchart 700 of FIG. 7 at continuation point B 701.

The operations of the flowcharts of FIGS. 5-7 continue at the flowchart 700 of FIG. 7. From the continuation point 701, the operations of the flowchart 700 continue at block 702.

At block 702, the power management module 214 determines whether ports on the switch (that are coupled to the data links used for data transmission) are inactive. With reference to FIGS. 2-3, the power management module 214 can request a status of these ports from the component controlling these ports. For example, a module (e.g., software, firmware, hardware, or a combination thereof) in the associated NICs can provide the status (active or inactive). If the ports on the switch (that are coupled to the data links used for data transmission) are inactive, the operations of the flowchart continue at block 704. Otherwise, operations of the flowchart 700 continue at block 706.

At block 704, the power management module 214 activates ports on the switch that are coupled to data links used for data transmission. In particular, the power management module 214 can issue an instruction to the module in the associated NICs (described above) that are controlling these ports to activate such ports. In response, the module can power on the ports that are part of the data transfer. Operations of the flowchart 700 continue at block 706.

At block 706, the power management module 214 determines whether ports on the switch that are not part of the data transfer are active. With reference to FIGS. 2-3, the power management module 214 can request a status of these ports from the component controlling these ports. For example, a module (e.g., software, firmware, hardware, or a combination thereof) in the associated NICs can provide the status (active or inactive). If the ports on the switch that are not part of the data transfer are active, the operations of the flowchart continue at block 708. Otherwise, operations of the flowchart continue at block 710.

At block 708, the power management module 214 deactivates ports on switch that are not part of the data transfer. In particular, the power management module 214 can issue an instruction to the module in the associated NICs (described above) that are controlling these ports to deactivate such ports. In response, the module can power down or place into a low power state the ports that are not part of the data transfer. Operations of the flowchart 700 continue at block 710.

At block 710, the coordinate module 218 performs the data transfer through the data links coupled to the identified data servers. In particular, the coordinate module 218 can receive the data from other data servers in the data warehouse. Alternatively or in addition, the data can be stored in the coordinate node server 206. The coordinate module 218 can transmit the data to the switch 202 using one or more of the links in the link aggregation group 276. The switch 202 can then output the data to the appropriate device that is communicatively coupled to the switch 202 (e.g., the client device that made the initial data query). Operations of the flowchart 700 continue at block 712.

At block 712, the power management module 214 deactivates data links and ports that are part of the data transfer after the data transfer. In particular, the power management module 214 can perform this deactivation after the time needed to perform the data transfer. This time needed can be determined prior to the data transfer occurring. Alternatively, the power management module 214 can perform this deactivation after the coordinate module 218 provides an indication of completion. In particular, the power management module 214 can issue an instruction to the module in the switch, the servers and/or the NICs (described above) that are controlling these data links and ports to deactivate such data links and ports. In response, these modules can power down or place into a low power state the data links and the ports that are part of the data transfer. In some example embodiments, there is no deactivation of this active links after the data transfer. Operations of the flowchart 700 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
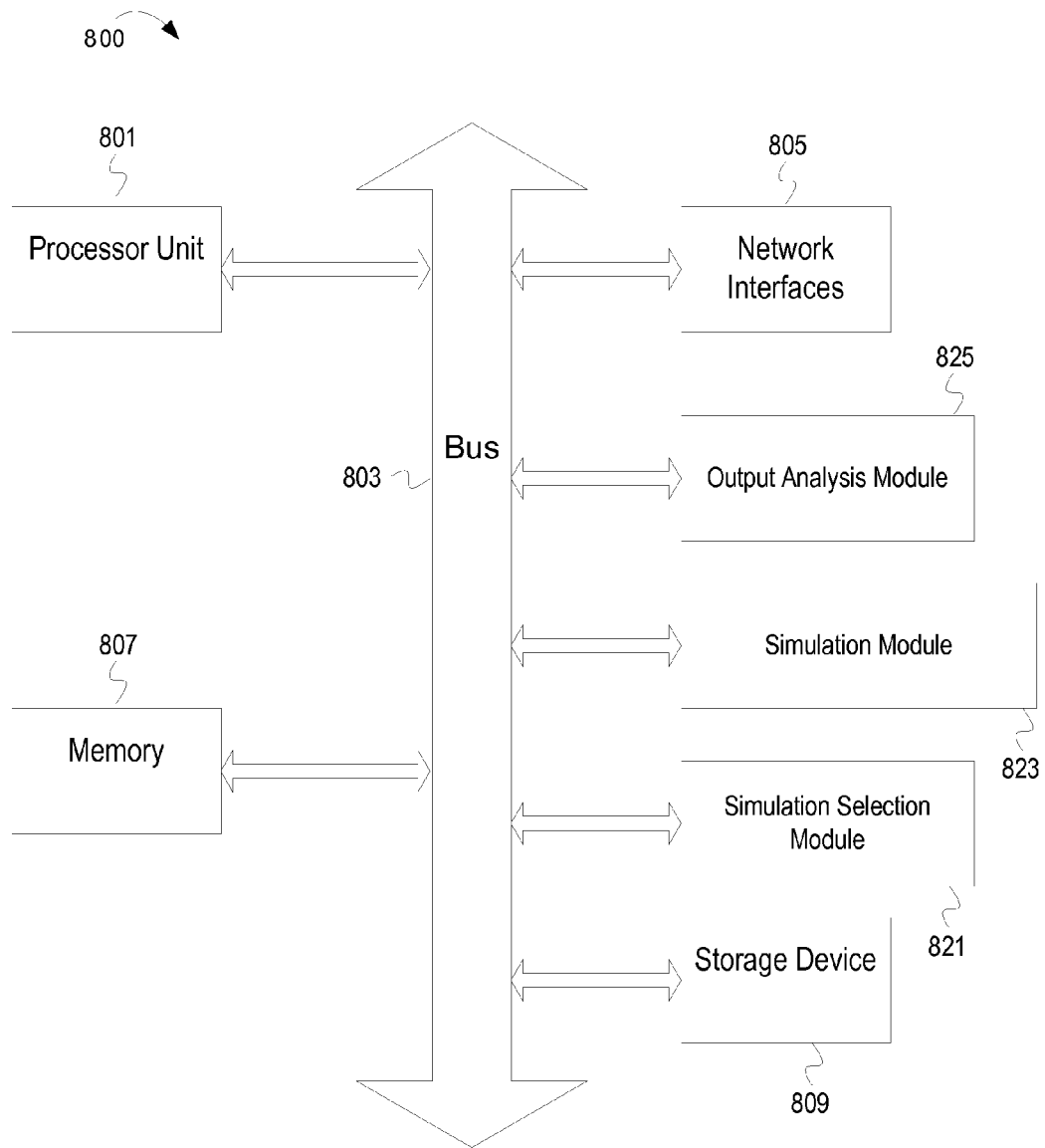
FIG. 8 depicts a computer system, according to some example embodiments.

FIG. 8 depicts a computer system, according to some example embodiments. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The system memory 807 embodies functionality to implement embodiments described above. The system memory 807 may include one or more functionalities that facilitate power management of link aggregation for data transmission. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques for power management for link aggregation of data transmission as described herein may be implemented with facilities consistent with any hardware system hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for processing a data query instruction, the computer program product comprising:
   a non-transitory computer readable storage medium having computer usable program code embodied therewith, the computer usable program code comprising a computer usable program code configured to:
   receive the data query instruction for execution, wherein execution of the data query instruction is to cause a data transfer into or from a data warehouse, the data warehouse comprising a number of data servers, wherein each of number of data servers are communicatively coupled for data transfer through a link aggregation group having at least two data links:
   and responsive to receipt of the data query instruction and prior to or at least partially overlapping with execution of the data query instruction to cause the data transfer, determine that the data query instruction references data stored on one or more of the data servers; identify on which of the number of data servers the data referenced by the data query is stored or to be stored identify, for each of the identified data servers, a minimum number of the at least two data links that are needed for the data transfer; and activate, if inactive, the minimum number of the at least two data links for each of the identified data servers.

2. The computer program product of claim 1, wherein the computer usable program code is configured to, responsive to receipt of the data query instruction and prior to or at least partially overlapping with execution of the data query instruction to cause the data transfer,
  deactivate, if active, at least one of the following:
    at least one of the at least two data links for each of the identified data servers that are not part of the data transfer; and
    at least one of at least two data links of the number of data servers that are not identified as part of the data transfer.

3. The computer program product of claim 1, wherein the computer usable program code is configured to, responsive to receipt of the data query instruction and prior to or at least partially overlapping with execution of the data query instruction to cause the data transfer,
  identify a length of time for the data transfer based on the amount of data that is part of the data transfer and the minimum number of the at least two data links that are needed.

4. The computer program product of claim 3, wherein the computer usable program code is configured to deactivate the minimum number of the at least two data links after the length of time has expired since a start of the data transfer.

5. The computer program product of claim 1, wherein the computer usable program code configured to identify on which of the number of data servers the data referenced by the data query instruction is stored or to be stored is configured to at least one of:
  interact with a database in order to identify on which of the number of data servers the data referenced by the data query is stored or to be stored;
  read metadata in order to identify on which of the number of data servers the data referenced by the data query is stored or to be stored; and
  generate an access plan, wherein the access plan indicates which of the number of data servers the data referenced by the data query is stored or to be stored on.

6. A computer program product for processing a data query instruction, the computer program product comprising:
  a non-transitory computer readable storage medium having computer usable program code embodied therewith, the computer usable program code comprising a computer usable program code configured to:
  receive a data query instruction for execution, wherein execution of the data query instruction is to cause a data transfer into or from a data warehouse, the data warehouse comprising a number of data servers, wherein each of number of data servers are communicatively coupled for data transfer through a link aggregation group having at least two data links;
  responsive to receipt of the data query instruction and prior to or at least partially overlapping with execution of the data query instruction to cause the data transfer, determine that the data query instruction references data stored on one or more of the data servers;
  identify on which of the number of data servers the data referenced by the data query is stored or to be stored;
  identify an amount of data that is part of the data transfer for each of the identified data servers;
  identify an amount of data that is part of the data transfer for each of the identified data servers;
  identify, for each of the identified data servers and based on the amount of data that is part of the data transfer for each of the identified data servers, a minimum number of the at least two data links that are needed for the data transfer;
  activate, if inactive, the minimum number of the at least two data links for each of the identified data servers;
  deactivate, if active, at least one of the following: at least one of the at least two data links for each of the identified data servers that are not part of the data transfer; and at least one of at least two data links of the number of data servers that are not identified as part of the data transfer.

7. The computer program product of claim 6, wherein the computer usable program code is configured to, responsive to receipt of the data query instruction and prior to or at least partially overlapping with execution of the data query instruction to cause the data transfer,
  activate, if inactive, ports of each of the identified data servers that are communicatively coupled to transfer data to and from the minimum number of the at least two data links.

8. The computer program product of claim 6, wherein the computer usable program code is configured to, responsive to receipt of the data query instruction and prior to or at least partially overlapping with execution of the data query instruction to cause the data transfer,
  responsive to deactivation of the at least one of the at least two data links for each of the identified servers, deactivate, if active, ports of each of the identified data servers that are communicatively coupled to transfer data to and from the at least one of the at least two data links; and
  responsive to deactivation of the at least one of the two data links of the number of data servers that are not identified as part of the data transfer, deactivate, if active, ports of the number of data servers that are not identified as part of the data transfer that are communicatively coupled to transfer data to and from the at least one of the at least two data links.

9. The computer program product of claim 6, wherein the computer usable program code is configured to, responsive to receipt of the data query instruction and prior to or at least partially overlapping with execution of the data query instruction to cause the data transfer,
  identify a length of time for the data transfer based on the amount of data that is part of the data transfer and the minimum number of the at least two data links that are needed.

10. The computer program product of claim 9, wherein the computer usable program code is further configured to deactivate the minimum number of the at least two data links after the length of time has expired since a start of the data transfer.

11. The computer program product of claim 6, wherein the computer usable program code configured to identify on which of the number of data servers the data referenced by the data query instruction is stored or to be stored is configured to at least one of:
  interact with a database in order to identify on which of the number of data servers the data referenced by the data query is stored or to be stored;
  read metadata in order to identify on which of the number of data servers the data referenced by the data query is stored or to be stored; and
  generate an access plan, wherein the access plan indicates which of the number of data servers the data referenced by the data query is stored or to be stored on.

12. An apparatus comprising:
  a processor;

a data locator module operable to execute on the processor, the data locator module configured to,
  receive a data query instruction for execution, wherein execution of the data query instruction is to cause a data transfer into or from a data warehouse, the data warehouse comprising a number of data servers, wherein each of number of data servers are communicatively coupled for data transfer through a link aggregation group having at least two data links; and
  responsive to receipt of the data query instruction and prior to or at least partially overlapping with execution of the data query instruction to cause the data transfer,
    determine that the data query instruction references data stored on one or more of the data servers;
    identify on which of the number of data servers the data referenced by the data query is stored or to be stored;
    identifying, for each of the identified data servers, a minimum number of the at least two data links that are needed for the data transfer; and
a power management module operable to execute on the processor, the power management module configured to,
  responsive to receipt of the data query instruction and prior to or at least partially overlapping with execution of the data query instruction to cause the data transfer,
    activate, if inactive, the minimum number of the at least two data links for each of the identified data servers.

13. The apparatus of claim 12, wherein the power management module, as part of the activation, is configured to cause power to be supplied to the minimum number of the at least two data links for each of the identified data servers to bring a power state of the minimum number of the at least two data links to a full power state to enable data transfer over the minimum number of the at least two data links.

14. The apparatus of claim 12, wherein the power management module is configured to,
  responsive to receiving the data query instruction and prior to or at least partially overlapping with execution of the data query instruction to cause the data transfer,
    deactivate, if active, at least one of the following:
      at least one of the at least two data links for each of the identified data servers that are not part of the data transfer; and
      at least one of at least two data links of the number of data servers that are not identified as part of the data transfer.

15. The apparatus of claim 12, wherein the data locator module configured to identify on which of the number of data servers the data referenced by the data query instruction is stored or to be stored is configured to at least one of:
  interact with a database in order to identify on which of the number of data servers the data referenced by the data query is stored or to be stored;
  read metadata in order to identify on which of the number of data servers the data referenced by the data query is stored or to be stored; and
  generate an access plan, wherein the access plan indicates which of the number of data servers the data referenced by the data query is stored or to be stored on.

* * * * *